United States Patent [19]

Sandow

[11] 4,112,515

[45] Sep. 5, 1978

[54] MIXING CATALYST AND CARRIER GAS FOR CURING FOUNDRY MOLDS AND CORES

[76] Inventor: Louis W. Sandow, N94 W15888 Ridgeview Dr., Menomonee Falls, Wis. 53051

[21] Appl. No.: 743,368

[22] Filed: Nov. 19, 1976

[51] Int. Cl.$^2$ .............................. B01J 8/02; B22C 9/12
[52] U.S. Cl. ........................................... 366/17; 164/4; 164/16; 164/154; 260/38
[58] Field of Search .................... 260/38, DIG. 40; 164/16; 366/17

[56] References Cited

U.S. PATENT DOCUMENTS

| | | | |
|---|---|---|---|
| 2,263,797 | 11/1941 | Christensen | 366/17 X |
| 2,917,465 | 12/1959 | Begley | 366/17 X |
| 3,409,579 | 11/1968 | Robins | 260/DIG. 40 |
| 3,639,654 | 2/1972 | Robins | 164/16 |
| 3,919,162 | 11/1975 | Austin | 260/DIG. 40 |

*Primary Examiner*—Sandra M. Person
*Attorney, Agent, or Firm*—Joseph P. House, Jr.

[57] ABSTRACT

Method and apparatus for mixing foundry mold catalyst and carrier gas when the catalyst is in the liquid phase and the carrier is in the gaseous phase at standard conditions of temperature and pressure. The catalyst liquid is heated to vaporize it and the resulting catalyst gas is then mixed with the carrier gas under control of an automatic gas flow regulator which maintains the mass ratio between the catalyst gas and the carrier gas at the desired level in the gaseous mixture notwithstanding variations in the flow rate of either or both gases. The gaseous mixture is then blown through foundry molds and cores to cure the resin binder therein.

6 Claims, 1 Drawing Figure

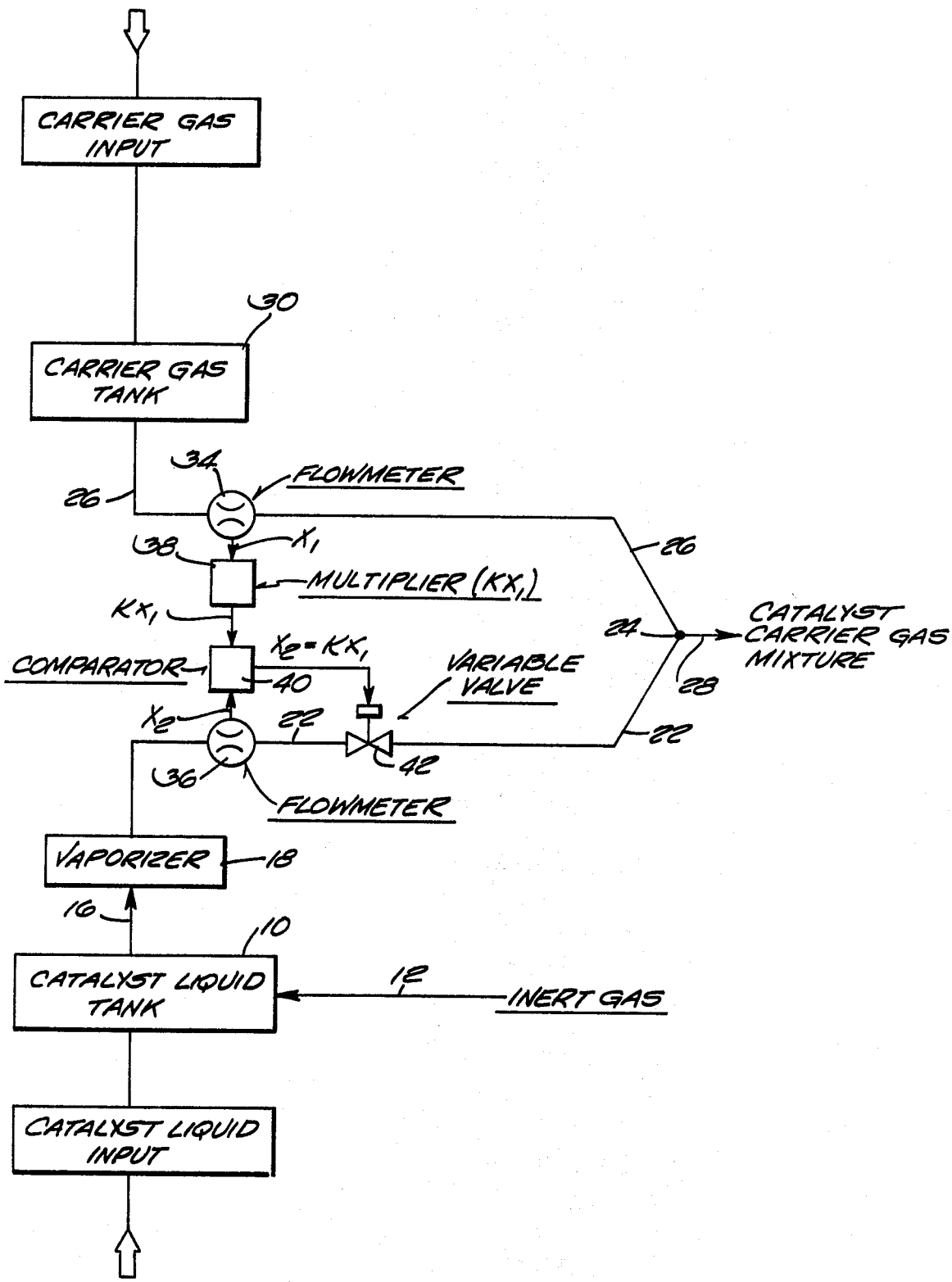

MIXING CATALYST AND CARRIER GAS FOR CURING FOUNDRY MOLDS AND CORES

BACKGROUND OF THE INVENTION

This invention relates to methods and apparatus for use in the manufacture of foundry molds and cores wherein a gas phase catalyst is used to cure the resin binder of a sand-resin mixture from which the mold or core is to be made. More particularly, this invention relates to methods and apparatus for use in systems wherein the catalyst is in the liquid phase at standard conditions of temperature and pressure (25° Celsius and 760 mm Hg.).

A popular group or family of catalysts for use in curing phenolic type resins is the tertiary amines such as dimethylethylamine and triethylamine. (See U.S. Pat. No. 3,409,579.) Since this resin-catalyst system is highly reactive, i.e., curing occurs almost instantaneously, it is common foundry practice to dilute the catalyst to concentrations (by weight) of below 25% in an inert carrier gas such as carbon dioxide or nitrogen and then blow the mixture into the mold or core box containing the resin coated sand.

The past method of introducing the above-noted catalysts, which are liquids at standard conditions of temperature and pressure, into the carrier gas stream is to either bubble the carrier gas through the liquid catalyst or to inject the liquid catalyst directly into the carrier gas stream via an injector or spray nozzle. These methods, however, do not provide any control over the catalyst concentration in the gas mixture and also are apt to introduce the catalyst into the mold or core as a fog or mist rather than a gas. Introduction as a gas is preferable because:

1. Speed of reaction is enhanced because of greater mobility of catalyst molecules in the gas phase over that of liquid phase molecules.

2. Residual catalyst in the cured core or mold results in fuming during metal pouring and defective castings. Common practice involves purging the core or mold with air prior to removing it from the forming box. Liquid phase catalyst requires greater amounts of air and longer cycle times which detract from over-all process economics.

SUMMARY OF THE INVENTION

One object of this invention is to provide a catalyst and carrier gas mixing system that will provide a consistent concentration by weight of catalyst in a suitable carrier gas over a wide temperature range and independent of the number of mold or core making machines drawing the mixture from the system.

A further object of this invention is to provide a catalyst and carrier gas mixing system that can be physically located remote from the main core or mold making area for reasons of safety and convenience, with the catalyst/carrier gas mixture being transported via piping into the area of use.

Prior art techniques previously mentioned do not achieve these objectives because:

1. Injection systems provide a fixed volume of liquid catalyst in a carrier gas stream and are cyclical in operation. An attempt is made to match that volume to the requirements of a particular core or mold. The injector is also actuated by core making machine controls. Consequently each machine requires its own generator. Further, since the curing cycle time begins at the time the catalyst injection begins and ends when the catalyst has passed through the core, the best economics are realized when the path length to core box is a minimum.

2. Bubbler type systems cannot provide a consistent concentration of catalyst-carrier gas in multiple machine situations. Concentration is a function of carrier gas bubble size, ascent time for the bubbles through the liquid, pressure within the liquid containing vessel, and temperature of the liquid and carrier gas. Two or more machines cycling simultaneously will, therefore, not produce the same concentration as a single machine cycle.

Another object of this invention is to provide a method and apparatus for mixing a catalyst with a carrier gas when the catalyst is in the liquid phase and the carrier gas is in the gaseous phase at standard conditions of temperature and pressure. The mixture is established by a desired mass ratio of the two gases which will remain constant over a total flow range defined by component sizing. Accordingly, there is no theoretical limit to the number of core or mold making machines that can be supplied by a single system. Moreover, once mixed, the mass ratio is constant for all practical purposes. Accordingly, the system can be located remotely from the main core or mold making area and the catalyst/carrier gas mixture can be carried through piping over long distances to the core/mold making molecules.

In general, the invention involves heating the liquid catalyst to vaporize it and flowing the gaseous catalyst in one pipe and flowing the carrier gas in another pipe to an ultimate point of mixture thereof, measuring the flow rates of the two gases through their respective pipes, comparing the flow rates with a predetermined flow rate ratio which corresponds to a desired mass ratio for the two gases and varying the flow rate through at least one of the two pipes when the measured flow rate ratio differs from the predetermined flow rate ratio in order to move the measured flow rate ratio toward the predetermined flow rate ratio.

Other objects, features and advantages of the invention will appear from the disclosure hereof.

DESCRIPTION OF THE DRAWING

The FIGURE is a schematic diagram of the preferred embodiment of the invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawing, liquid catalyst is introduced into a catalyst liquid tank 10 on a batch basis. Tank 10 is sealed after each filling and is pressurized with an inert gas such as nitrogen which is delivered into tank 10 through conduit 12 by a conventional source of pressurized gas such as a high pressure cylinder or bulk liquid station. The gas pressure in tank 10 forces the liquid catalyst through conduit 16 into a conventional vaporizer 18 which heats the liquid catalyst above its boiling point to vaporize it.

The resulting catalyst gas is delivered from vaporizer 18 through flow meter 36 and flow control valve 42 to catalyst gas conduit 22 which is coupled at 24 to a carrier gas conduit 26 and a catalyst-carrier gas mixture conduit 28.

Carrier gas is forced into conduit 26 and through flowmeter 34 from a pressurized carrier gas tank 30 which receives the carrier gas from a conventional source.

The carrier gas can be any inert gas such as nitrogen, carbon dioxide, or the like. The catalyst can be any suitable catalyst which is liquid at standard conditions of temperature and pressure. For phenolic type resins, the catalyst can be a tertiary amine such as dimethylethylamine or triethylamine. Other suitable resin-catalyst systems will be apparent to those skilled in the art, such as those disclosed in U.S. Pat. No. 3,409,579.

The proportions in which the catalyst gas is mixed with the carrier gas is controlled by an automatic gas flow regulator which includes a flowmeter 34 in carrier gas conduit 26, a flowmeter 36 in catalyst gas conduit 22, a multiplier 38 connected to the output of flowmeter 34, a comparator 40 with one input coupled to the output of multiplier 38 and the other input coupled to the output of flowmeter 36, with the output of comparator 40 being applied to the controller input of a variable valve 42 in conduit 22. The above-described gas flow regulator regulates the flow of gas through catalyst gas conduit 22 in accordance with the equation $X_2 = KX_1$ where $X_2$ is the mass of catalyst gas in the catalyst-carrier gas mixture, $X_1$ is the mass of carrier gas in the catalyst-carrier gas mixture and $K$ (the multiplication factor of multiplier 38) is the desired mass ratio of catalyst gas to carrier gas in the catalyst-carrier gas mixture. The ratio is established by over-all process requirements and these generally relate to the characteristics of the sand/resin mixture, configuration of the core or mold to be cured, and the desired maximum cure time.

Comparator 40 compares the $KX_1$ input from multiplier 38 with the $X_2$ input from flowmeter 36 and automatically (through conventional electromechanical means in valve 42) varies valve 42 to equalize the $KX_1$ and $X_2$ inputs. This automatically maintains the mass ratio $K$ of catalyst gas to carrier gas at the desired level set by multiplier 38 in spite of variations in the flow rate of either or both gases.

After the catalyst and carrier gases are mixed at junction 24, each gas expands to the pressure it would exert in the system if it were alone in the system. This expansion results in effectively superheating the catalyst gas such that the mixture can be cooled to a temperature considerably below the catalyst vaporization temperature before catalyst condensation occurs. As an example, for a system using dimethylethylamine as a catalyst in a carbon dioxide carrier gas at a total pressure of 35 psi, a temperature of 80° C. would be required to vaporize the catalyst. After mixing in the carrier gas in a mass ratio of 12% catalyst to 88% carrier gas, i.e., $K = 0.1363$ the catalyst dew point is below 4° C. This is well below the temperature in conduit 28 and at the point of use and insures that the catalyst will enter the mold or core as a gas, rather than as a fog or mist.

It should be noted that the equation $X_2 = KX_1$ can also be expressed as $X_1 = X_2/K$. To mechanize the latter equation, a divider $(X_2/K)$ would be connected to the output of flowmeter 36, multiplier 38 would be eliminated, one input of comparator 40 would be coupled to the output of the divider and the other input of comparator 40 would be coupled to the output of flowmeter 34, while variable valve 42 would be connected in carrier gas conduit 26, rather than in catalyst gas conduit 22.

However, the latter form of mechanization would produce the same results as the form shown in the FIGURE, since both would automatically regulate the flow of gases to achieve the desired mass ratio K. In one case, the flow of catalyst gas is controlled in accordance with the flow of carrier gas, while in the other case the flow of carrier gas is controlled in accordance with the flow of catalyst, but in both cases the mass ratio between the two gases at the junction 24 is maintained at the desired level K in spite of variations in the flow rate of either or both gases. It should also be noted that the equation $X_1 = X_2/K$ could be expressed and mechanized as $X_1 = CX_2$ where $C = (1/K)$. This may be more convenient in some applications since the values for K are less than one which makes the corresponding values for C greater than one.

I claim:

1. A method of mixing a carrier fluid which is gaseous at standard conditions of temperature and pressure with a foundry mold catalyst fluid which is liquid at standard conditions of temperature and pressure, comprising the steps of heating said liquid foundry mold catalyst fluid to vaporize it before it is mixed with the carrier fluid, flowing said carrier fluid in the gaseous state through a first conduit into a second conduit, flowing said foundry mold catalyst fluid in the gaseous state through a third conduit into said second conduit to form a gaseous mixture therein, controlling the flow rate in at least one of said first and third conduits in accordance with the equation $X_2 = KX_1$ where $X_1$ is the flow rate of said carrier fluid in the gaseous state, $X_2$ is the flow rate of said foundry mold catalyst fluid in the gaseous state, $K$ is a predetermined mass ratio between said foundry mold catalyst fluid and said carrier fluid in said gaseous mixture.

2. A method of mixing a carrier fluid which is gaseous at standard conditions of temperature and pressure with a foundry mold catalyst fluid which is liquid at standard conditions of temperature and pressure, comprising the steps of heating said foundry mold catalyst fluid to vaporize it before it is mixed with the carrier fluid, flowing said carrier fluid in the gaseous state through a first conduit into a second conduit, flowing said foundry mold catalyst fluid in the gaseous state through a third conduit into said second conduit to form a gaseous mixture therein, measuring the flow rate of said carrier fluid through said first conduit, measuring the flow rate of said foundry mold catalyst fluid through said third conduit, comparing said flow rates with a predetermined flow rate ratio which corresponds to a desired mass ratio for the two constituents of said gaseous mixture, varying the flow rate through at least one of said first and third conduits when the measured flow rate ratio differs from said predetermined flow rate ratio, said flow rate variation being in such direction as to move the measured flow rate ratio toward said predetermined flow rate ratio.

3. The method of claim 1 further comprising the step of blowing said gaseous mixture into said molds.

4. Apparatus for mixing a carrier fluid which is gaseous at standard conditions of temperature and pressure with a foundry mold catalyst fluid which is liquid at standard conditions of temperature and pressure, comprising means for heating said foundry mold catalyst fluid to vaporize it before it is mixed with the carrier fluid, a first conduit and a second conduit both coupled at one end to a third conduit, means for flowing said carrier fluid in the gaseous state into the other end of said first conduit, means for flowing said foundry mold catalyst fluid in the gaseous state into the other end of said second conduit, means in said first conduit for measuring the flow rate therethrough, means in said second conduit for measuring the flow rate therethrough, means for comparing the measured flow rates in said first and second conduits to a predetermined flow rate ratio which corresponds to a desired mass ratio for the two constituents of said gaseous mixture, means for varying the flow rate through at least one of said first and second conduits when the measured flow rate ratio differs from said predetermined flow rate ratio, said flow rate variation being in such direction as to move the measured flow rate ratio toward said predetermined flow rate ratio.

5. The apparatus of claim 4 wherein said means for comparing said measured flow rates to said predetermined flow rate ratio comprises a first flowmeter in said first conduit, a second flowmeter in said second conduit, a multiplier coupled to the output of said first flowmeter to multiply the flow rate of said first fluid by a constant K whose value represents a predetermined flow rate ratio which corresponds to a desired mass ratio between said second fluid and said first fluid in said gaseous mixture, and a comparator having two inputs and an output, one input of the comparator being coupled to the output of said multiplier and the other input of the comparator being coupled to the output of said second flowmeter.

6. The apparatus of claim 5 and further comprising variable valve means in said second conduit, the output of said comparator being coupled to said variable valve means, and said variable valve means being responsive to the output of said comparator to vary the flow rate of said second fluid so as to equalize the inputs to said comparator.

* * * * *